(12) United States Patent
Konno

(10) Patent No.: US 12,491,808 B2
(45) Date of Patent: Dec. 9, 2025

(54) SEAT COMPONENT, MOBILE BODY, AND ELECTROACOUSTIC TRANSDUCER

(71) Applicant: Panasonic Intellectual Property Management Co., Ltd., Osaka (JP)

(72) Inventor: Fumiyasu Konno, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 201 days.

(21) Appl. No.: 18/371,106

(22) Filed: Sep. 21, 2023

(65) Prior Publication Data

US 2024/0101010 A1 Mar. 28, 2024

(30) Foreign Application Priority Data

Sep. 28, 2022 (JP) ................... 2022-155489

(51) Int. Cl.
*B60N 2/879* (2018.01)
*H04R 1/02* (2006.01)

(52) U.S. Cl.
CPC ............ *B60N 2/879* (2018.02); *H04R 1/025* (2013.01)

(58) Field of Classification Search
CPC ........... A47C 7/72; B60N 2/879; H04R 1/025
See application file for complete search history.

(56) References Cited

U.S. PATENT DOCUMENTS

| 5,387,026 | A  | * | 2/1995  | Matsuhashi | A47C 7/727 |
| | | | | | 297/217.4 |
| 6,991,289 | B2 | * | 1/2006  | House | B60N 2/879 |
| | | | | | 297/217.4 |
| 10,064,496 | B2 | * | 9/2018  | Takada | B60R 11/02 |
| 10,730,423 | B2 | * | 8/2020  | Subat | H04R 5/023 |
| 11,689,856 | B2 | * | 6/2023  | Nelson | H04R 1/025 |
| | | | | | 381/301 |
| 11,838,740 | B2 | * | 12/2023 | Fryer | H04R 1/345 |
| 2010/0316235 | A1 | * | 12/2010 | Park | H04R 1/025 |
| | | | | | 381/151 |
| 2014/0064541 | A1 | * | 3/2014  | Guenther | H04R 1/288 |
| | | | | | 381/387 |
| 2017/0072869 | A1 | * | 3/2017  | Ito | H04R 5/023 |
| 2018/0035185 | A1 | * | 2/2018  | Fujita | A47C 7/38 |
| 2018/0281965 | A1 | * | 10/2018 | Pons | B60N 2/914 |
| 2021/0074258 | A1 | * | 3/2021  | Konno | G10K 11/17881 |
| 2022/0047084 | A1 | * | 2/2022  | Chalfin | H04R 5/023 |
| 2022/0159396 | A1 | * | 5/2022  | Fryer | H04R 5/02 |
| 2023/0036803 | A1 | * | 2/2023  | Konno | H04R 1/025 |
| 2024/0414474 | A1 | * | 12/2024 | Corynen | H04R 1/345 |

FOREIGN PATENT DOCUMENTS

JP 03-175798 7/1991

\* cited by examiner

*Primary Examiner* — Philip F Gabler
(74) *Attorney, Agent, or Firm* — Greenblum & Bernstein, P.L.C.

(57) ABSTRACT

A seat component includes: a diaphragm; an exciter that is attached to the diaphragm and causes the diaphragm to vibrate based on an electrical signal that is inputted; and a sound absorbing body that is disposed to cover a back side and a periphery of the exciter and the diaphragm, and functions as a cushion for a seated person.

9 Claims, 5 Drawing Sheets

SEAT COMPONENT, MOBILE BODY, AND ELECTROACOUSTIC TRANSDUCER

CROSS REFERENCE TO RELATED APPLICATION

The present application is based on and claims priority of Japanese Patent Application No. 2022-155489 filed on Sep. 28, 2022.

FIELD

The present disclosure relates to a seat component capable of emitting sound, a mobile body including a seat component capable of emitting sound, and an electroacoustic transducer.

BACKGROUND

Conventionally, there are techniques aimed at transmitting sound only to a person sitting at a predetermined position in a mobile body such as automobile, and the like. As one of these techniques, a narrow directivity loudspeaker system has been proposed. A narrow directivity loudspeaker system is a system in which a plurality of speakers are provided and directivity is controlled by signal processing. Furthermore, there is also a system in which a plurality of ultrasonic elements are provided and amplitude-modulated ultrasonic waves are emitted to thereby transmit sound only to a particular position. Furthermore, Patent Literature (PTL) 1 describes a technique in which an actuator provided inside a headrest of a seat is placed directly against the head of a person seated on the seat so that sound is transmitted by osteophony only to the person seated on the seat.

CITATION LIST

Patent Literature

PTL 1: Japanese Unexamined Patent Application Publication No. H3-175798

SUMMARY

However, the technique described in PTL 1 can be improved upon.

The present disclosure provides a seat component, a mobile body, and an electroacoustic transducer that are capable of improving upon the related art.

A seat component according to an aspect of the present disclosure includes: a diaphragm; an exciter that is attached to the diaphragm and causes the diaphragm to vibrate based on an electrical signal that is inputted; and a sound absorbing body that is disposed to cover a back side and a periphery of the exciter and the diaphragm, and functions as a cushion for a seated person.

A mobile body according to an aspect of the present disclosure includes a seat component that includes: a diaphragm; an exciter that is attached to the diaphragm and causes the diaphragm to vibrate based on an electrical signal that is inputted; and a sound absorbing body that is disposed to cover a back side and a periphery of the exciter and the diaphragm, and functions as a cushion for a seated person.

An electroacoustic transducer according to an aspect of the present disclosure includes: a diaphragm; an exciter that is attached to the diaphragm and causes the diaphragm to vibrate based on an electrical signal that is inputted; and a sound absorbing body that is disposed to cover a back side and a periphery of the exciter and the diaphragm.

According to the present disclosure, it is possible to improve upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
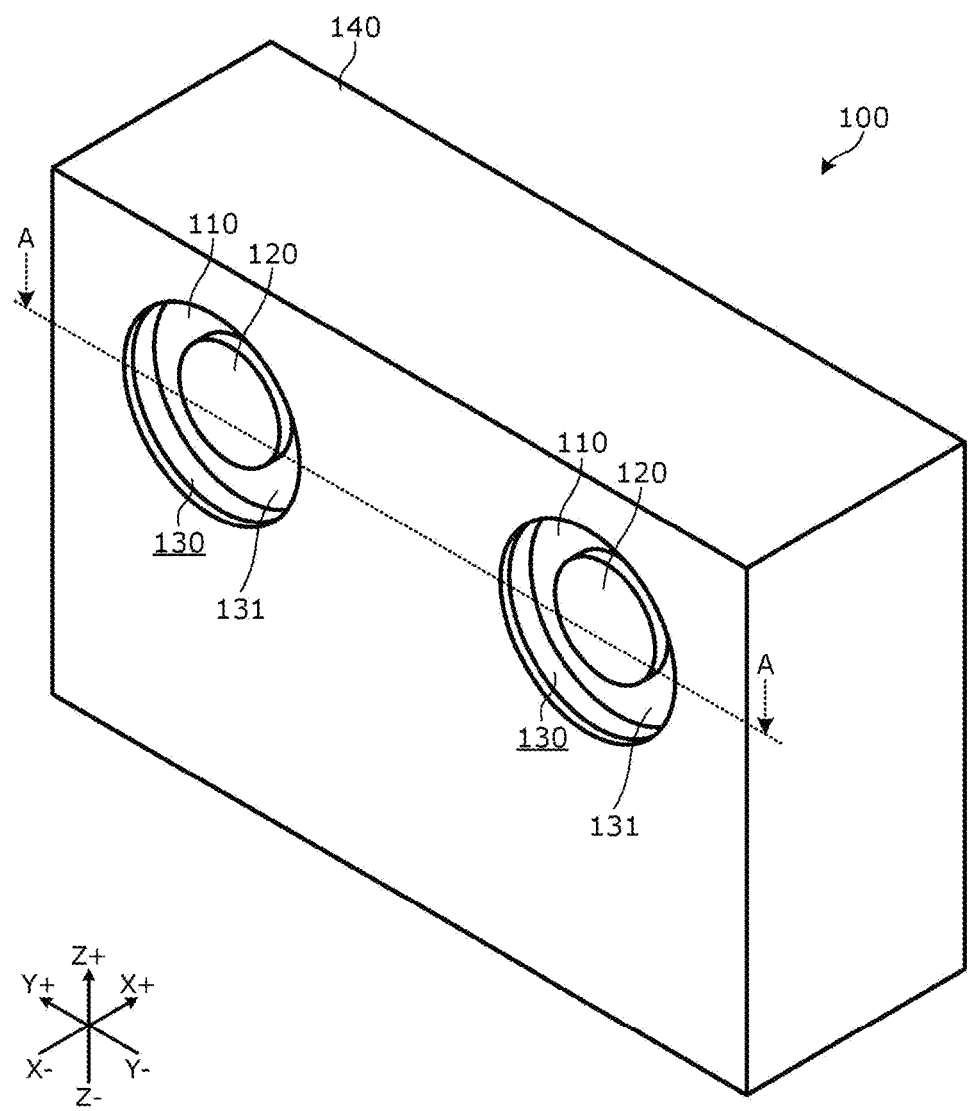
FIG. 1 is a perspective view of a seat component.

Hereinafter, exemplary embodiments of a seat component, a mobile body, and an electroacoustic transducer according to the present disclosure will be described with reference to the Drawings. It should be noted that each of the subsequent embodiments shows an example for describing the present disclosure, and thus is not intended to limit the present disclosure. For example, the shapes, structures, materials, structural components, the relative positional relationships and connections of the structural components, numerical values, formulas, steps, the processing order of the steps, and so on, shown in the following embodiments are mere examples, and details not described below may be included. Furthermore, although there are cases where geometric expressions, such as "parallel" and "orthogonal", are used, these expressions are not mathematically precise indications and include substantially permissible error, deviation, and the like. Moreover, expressions, such as "simultaneous" and "identical (or the same)", are considered to cover a substantially permissible range of meaning.

Additionally, the drawings are schematic illustrations that may include emphasis, omission, or adjustment of proportion as necessary for the purpose of describing the present disclosure, and thus the shapes, positional relationships, and proportions shown may be different from actuality. Furthermore, the X-axis, Y-axis, and Z-axis which may be shown in the drawings are arbitrarily set rectangular coordinates for describing the figures. In other words, the Z-axis is not limited to an axis in the vertical direction, and the X-axis and Y-axis are not limited to being axes inside a horizontal plane.

Furthermore, hereinafter, multiple inventions may be comprehensively described as a single embodiment. Moreover, part of the contents in the description below is described as an optional element related to the present disclosure.

Figure 2:
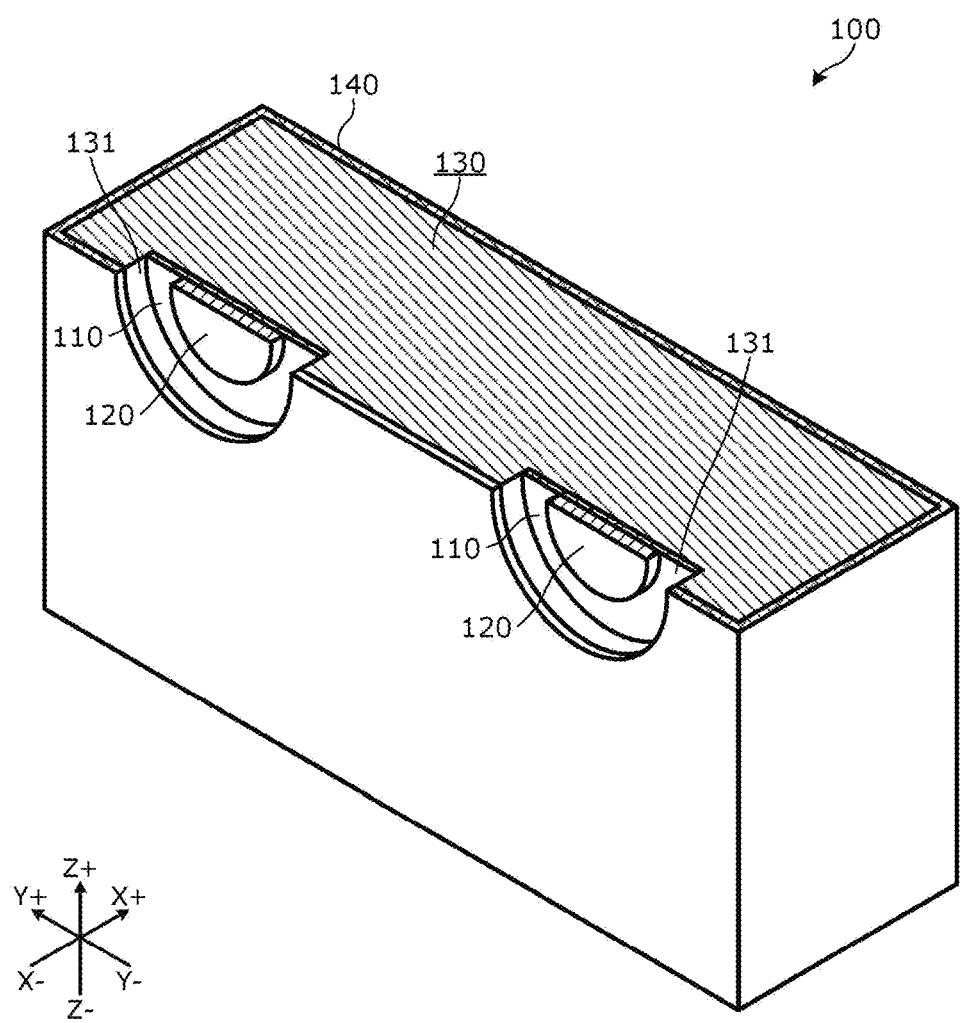
FIG. 2 is a cross-sectional perspective view of the seat component virtually cut along line A-A in FIG. 1.

FIG. 1 is a schematic diagram illustrating seat component 100. FIG. 2 is a cross-sectional perspective view of the seat component virtually cut along line A-A in FIG. 1. It should be noted that, in FIG. 1, FIG. 2, and so on, curves provided on the corners of seat component 100 are omitted. Seat component 100 is a component that constitutes a seat and functions as an electroacoustic transducer that generates sound. At least a portion of seat component 100 has springiness in order to serve as a cushion for a person seated on the seat. In this embodiment, seat component 100 is exemplified as a headrest. It should be noted that seat component 100 may be a seat bottom component, a backrest component, a side support component, an armrest component, and so on. Seat component 100 includes, as the electroacoustic transducer, diaphragm 110, exciter 120, and sound absorbing body 130. In this embodiment, seat component 100 includes covering material 140.

Diaphragm 110 is a tabular component capable of generating sound by having vibration applied thereon from exciter 120. Although there is no particular limitation as to the hardness of diaphragm 110, diaphragm 110 has a hardness that allows for the generation of sound due to vibration. The material of diaphragm 110 is more rigid than the material of sound absorbing body 130, and can be exemplified by, but not limited to, metal (including alloys), glass, ceramics, resin, and so on. In the present embodiment, diaphragm 110 is formed from an acrylic resin.

The form of attachment of diaphragm 110 is not particularly limited, and diaphragm 110 may be attached to a frame (not illustrated in the figures) provided inside seat component 100 that functions as a headrest, for example. In the present embodiment, diaphragm 110 is attached to sound absorbing body 130 using an adhesive and is held only by sound absorbing body 130.

Figure 3:
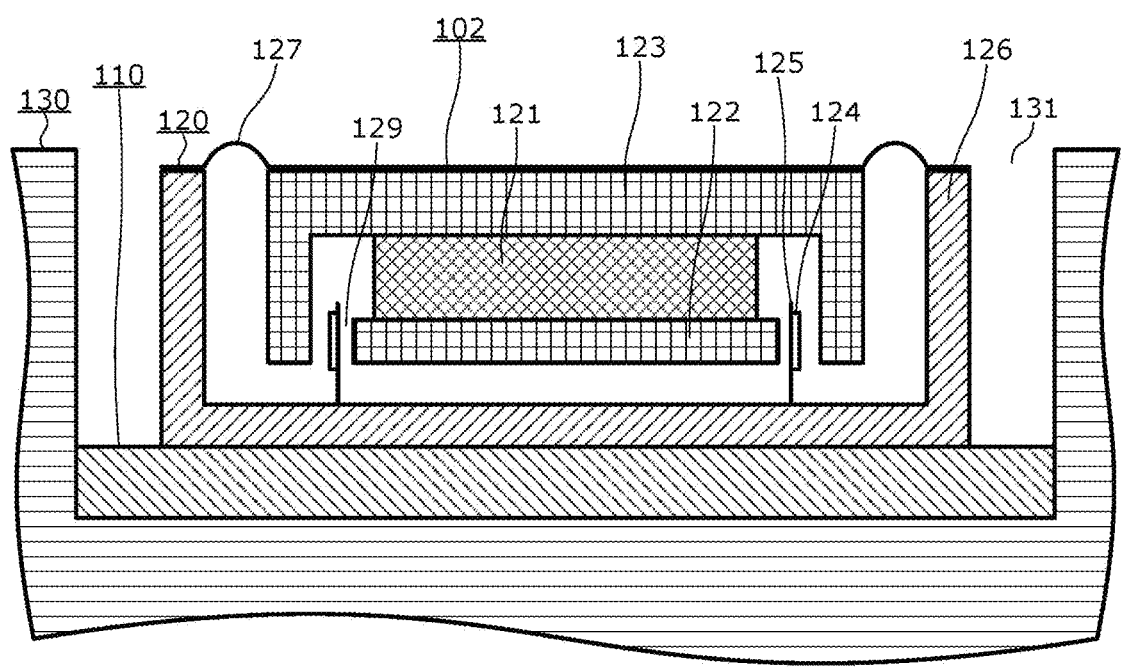
FIG. 3 is a cross-sectional view of an internal structure of an exciter.

FIG. 3 is a cross-sectional view of the internal structure of exciter 120. Exciter 120 is what is called an actuator (exciter) that is attached to diaphragm 110 and causes diaphragm 110 to vibrate based on inputted electrical signals. Exciter 120 is not limited in type, and may be exemplified by an exciter that uses a piezoelectric element, an exciter that uses a magnetostrictor, or the like. In the present embodiment, exciter 120 is a magnetic actuator that includes magnetic circuit 102, frame 126, and suspension 127.

Magnetic circuit 102 includes columnar magnet 121 which is a magnetized permanent magnet, disc-shaped top plate 122 that is attached to an end surface of magnet 121 in such a manner that the periphery of top plate 122 protrudes beyond magnet 121, and bottomed, cylindrical bottom plate 123 that is attached to the end surface of magnet 121 which is on the opposite side from top plate 122. Bottom plate 123 coaxially houses magnet 121 and top plate 122, and annular magnetic gap 129 is formed between top plate 122 and bottom plate 123. Coil 124 is disposed in magnetic gap 129.

Frame 126 is a structural component that holds magnetic circuit 102 and coil 124. Although frame 126 is not limited to a particular shape, frame 126 is in the shape of a bottomed cylinder in an overall view. The outer circumferential edge of bottom plate 123 of magnetic circuit 102 is disposed at a position that is surrounded by the edge portion of the open end of frame 126. Frame 126 and bottom plate 123 are bonded by adhesive via annular suspension 127 so as to be disposed coaxially.

An electrical signal indicating a sound is inputted to coil 124. Interaction between the magnetic force generated in coil 124 and the magnetic force present in magnetic gap 129 causes a force corresponding to the electrical signal to be generated in the winding axis direction (Z-axis direction in the figures) of coil 124. In this embodiment, coil 124 is wound around the outer circumference of cylindrical bobbin 125, and is attached to the center portion of frame 126 via bobbin 125.

With the above-described configuration, exciter 120 causes magnetic circuit 102 and frame 126 to relatively reciprocate in the winding axis direction of coil 124 based on the force generated in coil 124, to generate vibration. Exciter 120 can impart vibration corresponding to the electrical signal to diaphragm 110 which is joined to frame 126 by being bonded by adhesive. Accordingly, sound corresponding to the electrical signal is generated from diaphragm 110. It should be noted that sound corresponding to the electric signal is generated by vibration of bottom plate 123 of exciter 120.

Although the case of an inner magnet type magnetic circuit 102 has been described up to this point, magnetic circuit 102 included in exciter 120 is not limited to this type, and may be of the outer magnet type.

Sound absorbing body 130 is a component that is formed from a sound absorbing material and is disposed to cover the back side (the Z-side in the figures) and the periphery of exciter 120 and diaphragm 110. The sound absorbing material is a material that absorbs and dampens sound and can be exemplified by a material of flocculated glass fiber, resin fiber, natural fiber, and the like; a thick, non-woven fabric such as felt; or the like. In the present embodiment, sound absorbing body 130 also functions as a cushion for a person that is in contact with seat component 100. In other words, sound absorbing body 130 is made from a material that has both sound-absorbing and cushioning properties. Specifically, the material of sound absorbing body 130 can be exemplified by open-cell urethane foam, and the like.

In the present embodiment, sound absorbing body 130 is of a rectangular parallelepiped shape that can function as a headrest, and recess 131, which opens near an ear of the seated person, is formed in sound absorbing body 130. Diaphragm 110 and exciter 120 are housed in recess 131 of sound absorbing body 130. The entirety of the back surface and the peripheral surface of diaphragm 110 is in contact with sound absorbing body 130. Accordingly, the directivity of sound that is transmitted can be narrowed down. In sound absorbing body 130, recess 131 is provided in each of positions corresponding to the ears of a person, and one each of diaphragm 110 and exciter 120 is housed inside each of the two recesses 131.

Covering material 140 is a component that covers the outer surface of sound absorbing body 130, and a hole is provided at each of the positions corresponding to the openings of recesses 131 of sound absorbing body 130. Covering material 140 is more rigid than sound absorbing body 130 and softer than diaphragm 110, maintains the shape of sound absorbing body 130 without losing the cushioning property of sound absorbing body 130, and enhances the design of seat component 100. The material of covering material 140 can be exemplified by, but not limited to, woven fabric, artificial leather, natural leather, and so on.

It should be noted that a mesh material may be stretched across to cover the openings of recesses 131 and the holes of covering material 140. This can prevent the inside of recesses 131 from becoming dirty and can enhance the design of seat component 100.

As described above, seat component 100 that functions as a headrest includes: diaphragm 100, exciter 130 that is attached to diaphragm 110 and causes diaphragm 110 to vibrate based on an electrical signal that is inputted; and sound absorbing body 130 that is disposed to cover the back and periphery of exciter 120 and diaphragm 110, and functions as a cushion for a seated person.

Figure 4:
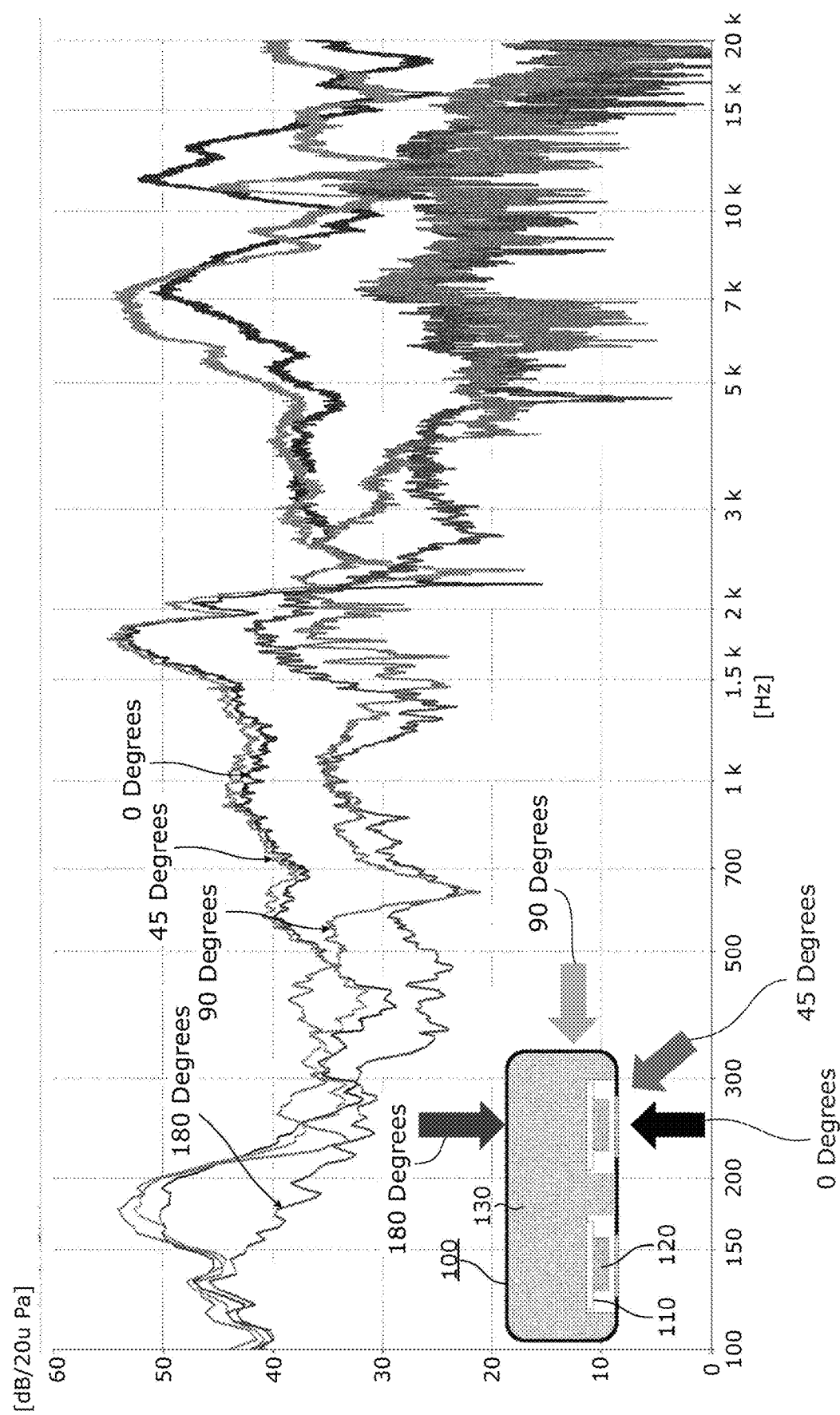
FIG. 4 is a graph illustrating sound pressure frequency response of the seat component for respective directions.

As in the sound pressure frequency response illustrated in FIG. 4, according to such seat component 100, in the 180 degree position which is the back side of exciter 120, sound pressure decreases significantly from the low range up to the high range. Likewise, in the 90 degree position which is the lateral side of exciter 120, sound volume also decreases significantly up to the high range. In contrast, in the 0 degree position and the 45 degree position which are the front side of exciter 120 and are portions corresponding to the ears of a seated person, a significant decrease in sound pressure cannot be seen. In other words, seat component 100 is capable of emitting sound with narrow directivity toward the ears of the seated person. This seat component 100 including diaphragm 110 and exciter 120 (hereinafter also referred to as sound-emitting device) makes it possible to transmit sound only to the seated person.

Furthermore, the inventor has found that a seat component 100 that includes the sound-emitting device has higher directivity than a seat component 100 that includes a speaker having a vibrating membrane.

Furthermore, exciter 120 or diaphragm 110 is held by sound absorbing body 130. Accordingly, the frame, and so on, that supports seat component 100 vibrates due to exciter 120, and thus emission of sound from an unintended place can be prevented, and the narrow directivity of seat component 100 can be maintained.

Furthermore, seat component 100 includes covering material 140 that covers the outer surface of sound absorbing body 130, and is more rigid than sound absorbing body 130 and softer than diaphragm 110.

Accordingly, the shape of comparatively soft sound absorbing body 130 can be stabilized by covering material 140, and thus the cushioning property of seat component 100 can be maintained while maintaining the shape of seat component 100. Furthermore, covering material 140 can enhance the design of seat component 100.

Figure 5:
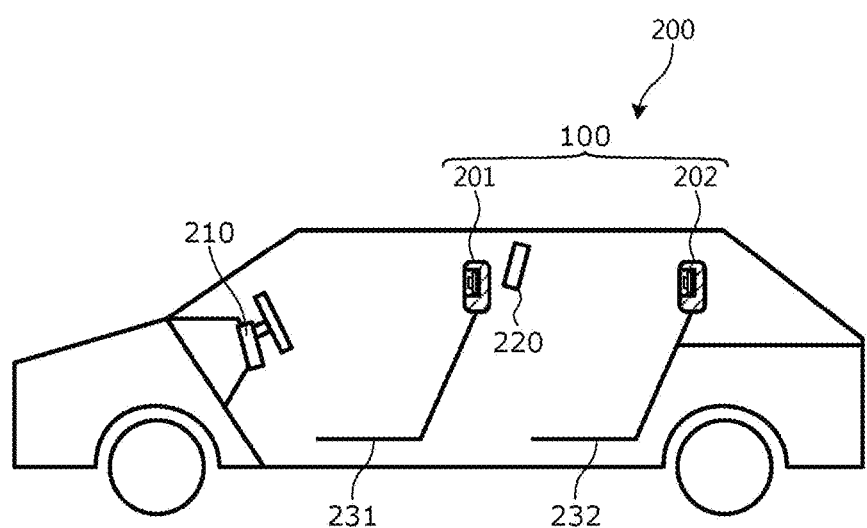
FIG. 5 is a cross-sectional view of a mobile body.

Next, mobile body 200 including seat component 100 will be described. FIG. 5 is a cross-sectional view of mobile body 200 which is an embodiment of the present disclosure. In this embodiment, description is carried out with mobile body 200 being exemplified by an automobile.

As described in the figure, mobile body 200 of the present disclosure includes first seat component 201 as a headrest of first seat 231 which is the driver's seat on which a driver sits, and second seat component 202 as a headrest of second seat 232 which is one of the rear seats. It should be noted that, although not illustrated in the figure, mobile body 200 also includes, as a headrest in a third seat which is a passenger's seat, seat component 100 that also functions as an electroacoustic transducer. Mobile body 200 includes, in each of the rear seats including second seat 232, seat component 100 as a headrest.

A different sound can be transmitted from each seat component 100 according to the person seated on the seat. For example, a sound based on a sound signal sent from car navigation system 210 can be transmitted to the driver from first seat component 201 of first seat 231. On the other hand, a sound based on a sound signal sent from onboard television system 220 can be transmitted to a person sitting in a rear seat from second seat component 202 of second seat 232 that is the rear seat.

In this manner, even when a different electrical signal is inputted to seat component 100 provided in each of the different seats such that a different sound is reproduced from each seat component 100, since the audible space is limited due to the narrow directivity of seat components 100, a different sound can be transmitted to each person seated on a different seat.

It should be noted that the present disclosure is not limited to the above-described embodiments. For example, other embodiments that can be realized by arbitrarily combining structural elements or removing some structural elements described in the present Specification may be embodiments of the present disclosure. Furthermore, variations obtainable through various modifications to the above-described embodiments that can be conceived by a person of ordinary skill in the art without departing from the essence of the present disclosure, that is, the meaning of the recitations in the Claims are included in the present disclosure.

For example, although the case where seat component 100 includes two sound-emitting devices has been described, seat component 100 may include a single sound-emitting device or three or more sound-emitting devices.

Furthermore, seat component 100 may include multiple types of sound-emitting devices, such as a high-range sound-emitting device, a middle-range sound-emitting device, and a low-range sound-emitting device.

Furthermore, although mobile body 200 is exemplified by an automobile, mobile body 200 may also be an airplane, a ship, a train, etc.

Furthermore, although seat component 100 capable of emitting sound is described as a structural component of a seat, the present disclosure may be implemented as an electroacoustic transducer including diaphragm 110, exciter 120, and sound absorbing body 130, and need not be included in a seat. The electroacoustic transducer may include covering material 140.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in its entirety: Japanese Patent Application No. 2022-155489 filed on Sep. 28, 2022

INDUSTRIAL APPLICABILITY

The present disclosure can be used as a seat component that functions as a structural component of a seat or as an electroacoustic transducer that is not a structural component of a seat.

The invention claimed is:

1. A seat component comprising:
   a diaphragm;
   an exciter that is attached to the diaphragm and causes the diaphragm to vibrate based on an electrical signal that is inputted; and
   a sound absorbing body that is disposed to cover a back side and a periphery of the exciter and the diaphragm, and functions as a cushion for a seated person, wherein
   the diaphragm is provided on the sound absorbing body with at least a part of the diaphragm in direct contact with the sound absorbing body.

2. The seat component according to claim 1, wherein the exciter or the diaphragm is held by the sound absorbing body.

3. The seat component according to claim 1, further comprising:
   a covering material that covers an outer surface of the sound absorbing body, the covering material being more rigid than the sound absorbing body and softer than the diaphragm.

4. A mobile body comprising:
   a seat component that includes:
   a diaphragm;

an exciter that is attached to the diaphragm and causes the diaphragm to vibrate based on an electrical signal that is inputted; and a sound absorbing body that is disposed to cover a back side and a periphery of the exciter and the diaphragm, and functions as a cushion for a seated person, wherein the diaphragm is provided on the sound absorbing body with at least a part of the diaphragm in direct contact with the sound absorbing body.

5. The mobile body according to claim 4, further comprising:

a plurality of seats on each of which a person sits, and a plurality of the seat components, wherein at least two of the plurality of seats each include a seat component, of the plurality of seat components.

6. An electroacoustic transducer comprising:

a diaphragm;

an exciter that is attached to the diaphragm and causes the diaphragm to vibrate based on an electrical signal that is inputted; and a sound absorbing body that is disposed to cover a back side and a periphery of the exciter and the diaphragm, wherein the diaphragm is provided on the sound absorbing body with at least a part of the diaphragm in direct contact with the sound absorbing body.

7. The seat component according to claim 1, wherein the diaphragm includes a first surface and a second surface on the opposite side to the first surface, the diaphragm is provided on the sound absorbing body with the second surface in direct contact with the sound absorbing body, and the exciter is attached to the first surface of the diaphragm.

8. The seat component according to claim 7, wherein the diaphragm includes a peripheral surface connecting the first surface and the second surface, the diaphragm is provided on the sound absorbing body with the peripheral surface in direct contact with the sound absorbing body.

9. The seat component according to claim 1, wherein the sound absorbing body is formed with a recess having an opening and a bottom surface facing the opening, and the diaphragm and the exciter are housed in the recess in order from the bottom surface toward the opening.

* * * * *